Feb. 9, 1954  A. E. MURRAY  2,668,304
PROCESS OF MAKING SHOES FOR NORMAL WEAR
Filed Nov. 5, 1948  6 Sheets-Sheet 1

INVENTOR
Alan E. Murray
BY
Arthur Wright
ATTORNEY

Feb. 9, 1954 A. E. MURRAY 2,668,304
PROCESS OF MAKING SHOES FOR NORMAL WEAR
Filed Nov. 5, 1948 6 Sheets-Sheet 2

INVENTOR
Alan E. Murray
BY
Arthur Wright
ATTORNEY

Feb. 9, 1954 A. E. MURRAY 2,668,304
PROCESS OF MAKING SHOES FOR NORMAL WEAR
Filed Nov. 5, 1948 6 Sheets-Sheet 3

INVENTOR
Alan E. Murray
BY
ATTORNEY

Feb. 9, 1954 A. E. MURRAY 2,668,304
PROCESS OF MAKING SHOES FOR NORMAL WEAR
Filed Nov. 5, 1948 6 Sheets-Sheet 4

INVENTOR
Alan E. Murray
BY
Arthur Wright
ATTORNEY

Feb. 9, 1954  A. E. MURRAY  2,668,304
PROCESS OF MAKING SHOES FOR NORMAL WEAR
Filed Nov. 5, 1948  6 Sheets-Sheet 5

INVENTOR
Alan E. Murray
BY
Arthur Wright
ATTORNEY

Feb. 9, 1954    A. E. MURRAY    2,668,304
PROCESS OF MAKING SHOES FOR NORMAL WEAR
Filed Nov. 5, 1948

INVENTOR
Alan E. Murray
BY
Arthur Wright
ATTORNEY

Patented Feb. 9, 1954

2,668,304

UNITED STATES PATENT OFFICE 2,668,304

PROCESS OF MAKING SHOES FOR NORMAL WEAR

Alan E. Murray, New York, N. Y.

Application November 5, 1948, Serial No. 58,470

2 Claims. (Cl. 12—142)

My invention relates particularly to the process of making shoes of a type which can be worn by anyone on any type of feet but which are especially adaptable for wear on the normal type of feet, that is to say which have not been subjected to abnormal deformations by other types of footwear or other abnormal conditions.

The object of my invention is to provide a process of making shoes, which is capable of universal use as it can be adapted to all types of feet and made accessible to all wearers because of the comparatively inexpensive process of making the same and the minimum cost of materials therein, but which is especially applicable for use on feet which are normal, or approximately normal, that is to say where the feet have not been seriously deformed by the previous use of incorrect footwear or for other reasons.

I have found that, in regard to the plantar or supporting area of the foot, there are different depths of curvature in different feet. Feet of the normal type are generally found to conform to deeper curves of the plantar area, while feet which are abnormal are generally found to have more shallow curves. Also, it must be borne in mind that the usual flat weight-bearing surfaces for supporting the feet tend to result in injury to or deformation of the feet supported thereon, the extent of which depends upon the length of the period of time involved. However, it is apparent that the foot would be weakened by giving it an undue exaggeration of the curvature of the support beyond that which is necessary for the support of the foot, especially in the case of abnormal feet. Therefore, I find it desirable to use only a minimum depth curvature and no more than is required, especially in the case of feet which are normal or approximately so. Besides, in completing the shoes, this must be done without inducing distortion, as for instance by supporting the foot with an upper which incorrectly or improperly supports the said upper portion of the foot against the reaction pressures which are exerted from the sole of the foot. Accordingly, when the foot is supported from below on a surface which may be yieldable so as to conform to the desired extent to the curvatures of the plantar or weight-bearing surface of the foot, it is necessary for the upper portion of the foot to be supported from above by being confined by an upper, acting as a baffle, conforming to the contours of the upper portion of the particular foot, to attain thereby the proper normal distribution of equalized forces on the foot, from the plantar area of the foot which are exerted upwardly by a sole yieldable to the different pressures exerted on it by the foot. In other words, if these upward pressures from the sole are exerted against the foot while incorrectly supported from above over the entire upper portion of the foot, unnatural stresses will be exerted within the foot, tending to produce changes in the shape of the foot that are distinctly harmful and which can result in unnatural deformation of the foot.

In carrying out my invention the conformation of the sole portion of the shoe is obtained while the foot is supported from above against an upper which is preferably made to conform to the upper portion of the foot while the foot is not subjected to weight-bearing to any great extent.

Furthermore, in accordance with my invention, the shoes are made much more accessible for universal wear because of the fact that they can be very readily made, and by the wearer himself from his own feet, if desired. In fact, the casts made in accordance therewith can be made in about one quarter the time required in making the casts previously for the individual wearer. They can be used even while the plaster is still warm and not completely hard or set, and much less experience is needed in carrying out the process of making the shoes therefrom, as there is considerably less room for error in making the same. Accordingly, it becomes feasible even to enable the individual wearer to make his own shoes by this process.

While my invention is capable of being carried out in many different ways, for the purpose of illustration I have shown only certain ways of proceeding in the accompanying drawings, in which—

Figure 1:
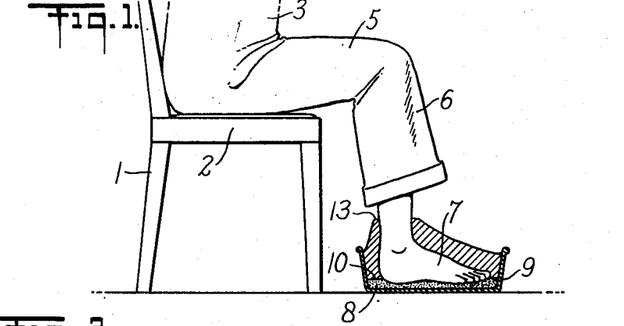
Fig. 1 is a diagrammatic side elevation of the position of a person while having the initial or negative cast made in producing the shoes, showing the outer side of the right foot.
Figure 2:
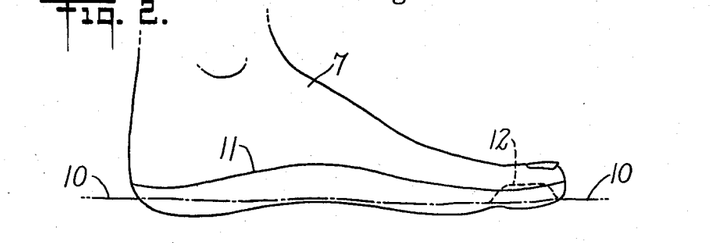
Fig. 2 is an inner elevation, enlarged, of the left foot in the position shown in Fig. 1, while having the negative cast made.
Figure 3:
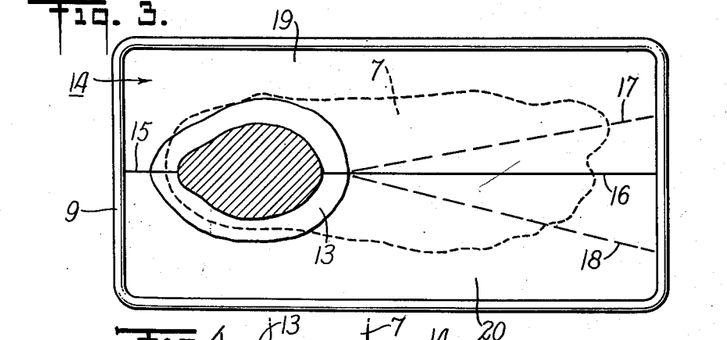
Fig. 3 is a plan view showing the foot of Fig. 1, in position in a pan having sand therein underlying the foot and the negative cast material poured onto the same, and also showing the position of the front and rear cuts in said cast.
Figure 4:
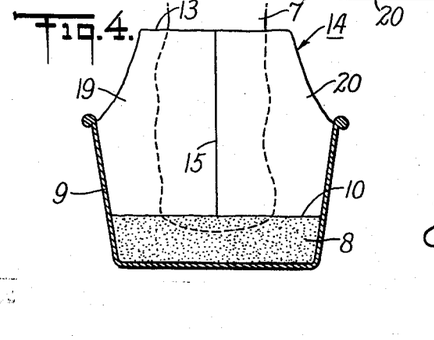
Fig. 4 is a rear elevation, partly in section, of the said pan with the foot therein, with the negative cast material poured onto the same, and provided with a rear vertical cut in the cast.

In the process of carrying out my invention illustrated particularly in Figs. 1 to 20, in making the shoe I may utilize a chair or settee 1 having a seat 2 on which a person 3 whose shoes are to be made is seated so that the upper portion of the leg 5 is spaced slightly above the edge of the seat 2 of the chair. The leg, at its lower portion 6, extends substantially vertically so that the right foot 7, for example, rests on a body of dry sand 8 in a pan 9. The sand 8 is adjusted so that its level 10 is slightly below the upper edge of the plantar or supporting surface of the foot. This is considerably below the level of the undercut line 11 of the foot, as indicated in Fig. 2 for example. In order to prevent the negative cast, which is to be made on the foot, from locking on the toes I elevate the sand level to points half way up the interstices between the toes at 12 and apply a few drops of water to the sand in the interstices of the toes, to moisten the sand and thus prevent it from falling downwardly between the toes.

I then prepare, in a basin of about 12" diameter, a body of plaster of Paris of any desired proportions but which may be comprised, for example, of water and plaster of Paris to provide a consistency of a thick cream, in accordance with the usual procedure in making plaster of Paris casts, and, preferably, I stir into the same common salt, sodium chloride, in the proportion of, for example, 1 to 3 teaspoonfuls of salt to the plaster of Paris and water in the basin, which is about three-fourths filled therewith. I then, with a spoon, apply the plaster of Paris mixture, while in the consistency of a thick cream, to the outside of the foot to a level 13 just above the ankle joint, until a negative cast 14 is formed. The salt accelerates the setting of the plaster of Paris, which will partially set in about two minutes after the same has been applied to the foot. It is understood that the plaster of Paris will substantially completely set in about five minutes from the time of being applied, varying according to the temperature of the water and the amount of salt present. When, thus, partially set, a rear vertical cut 15 is made on the rear of the negative cast 14 and a front longitudinal cut 16 is made either at the place shown in full lines in Fig. 3 or at any other desired place thereon, for example as shown in dotted lines at 17 or 18. These cuts are made with a dull knife or spatula so as to cut the cast almost through to the surface of the foot.

The said person then elevates his foot together with the pan and the pan 9 is tapped with a hammer or other instrument to remove the pan 9 from the negative cast 14, which is on the foot. A tool, such as a screw driver, is then inserted into the cracks 15 and 16 to separate the negative cast 14 into two parts 19 and 20. The natural oil of the skin prevents the plaster cast from sticking to the foot, and if hair is present on the foot this can be shaved off previously to making the negative cast 14.

The two pieces 19 and 20 of the negative cast are thereupon stuck together at their adjacent edges with any desired kind of cement. The resulting negative cast 14 is now soaked in water for about one half hour, or sufficiently long to allow the air present therein to bubble out of the cast. Then the cast 14 is immediately brushed, preferably while damp, with a water solution of water glass or silicate of soda of any desired strength, which may be thick or thin as desired. The purpose of applying the water glass or silicate of soda is to enable the negative cast 14 to be separated readily from the positive cast to be obtained therefrom, as hereinafter described, without sticking thereto. I then provide a basin containing dry sand and invert the negative cast 14 into the same so that the neck or upper portion 13 extends downwardly into the sand to a depth of about one half inch, or until the sand enters the end of the ankle portion thereof. Thereupon, I mix another batch of plaster of Paris in the same way as described above, and which is then poured downwardly into the upside down neck of the cast 14, while tapping the mold lightly to cause the plaster of Paris to enter all of the grooves and contours of the same. It is then allowed to set, by standing overnight for example. A positive cast 21 is thus obtained, which may have a flat undersurface 22 or a concave under surface 23 or a convex under surface 24, as desired, by forming the under surface of the positive cast 21, accordingly, during or before setting. Perhaps the preferable form is the slightly concave surface 23, which provides a crown shape on the inside of the shoe which is to be made on the cast 21. The positive cast 21 is thus readily and expeditiously made and it can be made even by the wearer of the shoes for his own use, or it can be made, instead, by an expert, if desired. Thereupon I proceed to make the shoe on the cast 21, it being understood that the cast has spaces which extend downwardly from the upper surface of the positive 21, upwardly from its under surface and rearwardly from its front-end surface between the toes to some extent. Nothing, otherwise than "forming the undersurface of the positive cast" as above referred to, need be done to the cast, as to its shape or contours.

In making the shoe I provide two solutions of any adhesive desired, but preferably made of neoprene latex. In this connection, I prefer to use a self-vulcanizing latex of rubber or self-vulcanizing synthetic rubber substitute, as for instance neoprene, in the form of liquid, that is to say a water suspension of the rubber or rubber substitute prepared so as to be self-vulcanizing when allowed to set. Also, I prefer to use two different strengths or consistencies of the said liquid latex, which I may denominate for the purpose as

1—thin latex having the consistency of thick milk.

2—thick latex having the consistency of a very heavy cream.

These are both well known commercially-available liquids known as neoprene latex, and which will, for convenience, be referred to hereinafter merely as "latex."

Figure 5:
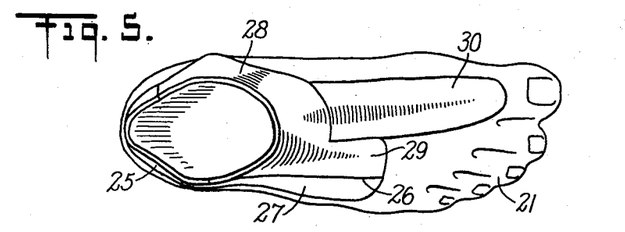
Fig. 5 is a diagrammatic plan view of the positive cast showing the position of the edge liners and a tongue thereon.
Figure 6:
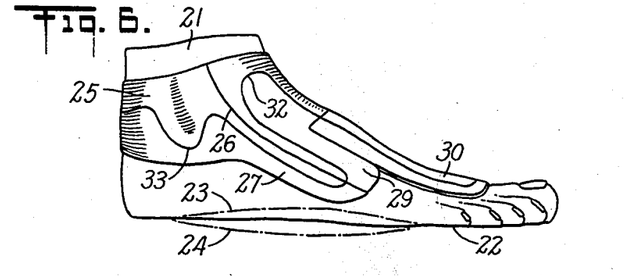
Fig. 6 is a side elevation of the positive cast showing the position of the edge liners and a tongue on the outer face of the right foot.
Figure 7:
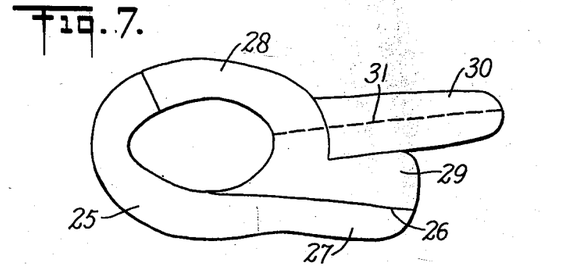
Fig. 7 is a diagrammatic plan view showing the position on the top of the right foot cast of the leather edge liners and the tongue extension applied thereto, and indicating the positions of the two front slits to be made in the shoe.
Figure 8:
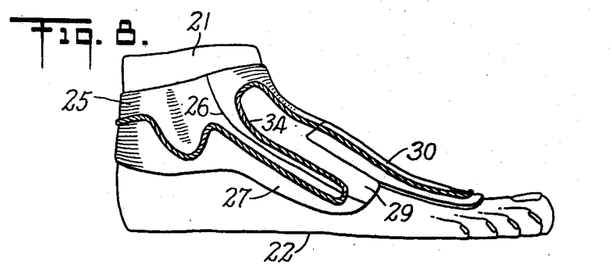
Fig. 8 is a side elevation of the outer side of the right foot positive cast, indicating the position of the top edge cord on the shoe.

I next provide two edge liners, that is to say a rear edge liner 25 extending, for instance, on the right foot cast from the inner rear face of the cast around the rear to and including the rear right edge of a lacing slit 26, formed at the right of a forward tongue 27 on said edge liner, and a forward edge liner 28 extending on the left face of said cast from a point abutting the inner end of the edge liner 25 forwardly, to provide a tongue 29 adjacent the lacing slit 26, as shown in Figs. 5 and 7. These edge liners 25 and 28 are made of thin leather and are stuck to the cast 21, having the flesh side out, with the latex #1. Similarly, there is stuck to the cast 21 a forwardly directed tongue 30 of leather, as shown in Fig. 7, adjacent to the tongue 29 and abutting the edge liner 28 so as to provide, as hereinafter described, a lace adjusting slit 31. Thereupon, I make a pencil line 32 around the edge liners 25 and 28, following the final upper edge position which is to be provided for the shoe and providing on the outer face of the cast a downward curvature 33 to give ample room for the ankle joint, also extending down and around the position of the lacing slit 26 and extending down and around part of the adjusting slit 31. Following the pencil line 32, I apply, with an eye dropper, a line of the latex #1. Then I immediately apply to the said line 32 a cord of any desired diameter, but which may be, for instance, a hard twisted cotton fish line cord 34 of about 1/16" diameter, which has been previously dusted with powdered plaster of Paris to accelerate the setting of the latex, so that it is caused to set almost immediately. This will form the top edge of the shoe and go down around the two slits 26 and 31 made for the lacings at the front of the shoe, with a width between the cords of about 1/4" at the slit 31 and about 1/2" at the slit 26. The portions of the edge liners 25 and 28, above the cord 34 and to any extent desired between the downwardly directed portions thereof at the slits 26 and 31, are then cut off with a pair of scissors.

Figure 9:
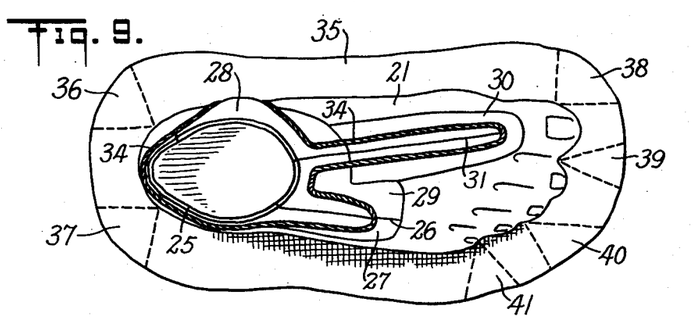
Fig. 9 is a plan view of the positive cast showing the first layer of fabric placed under the positive cast.
Figure 10:
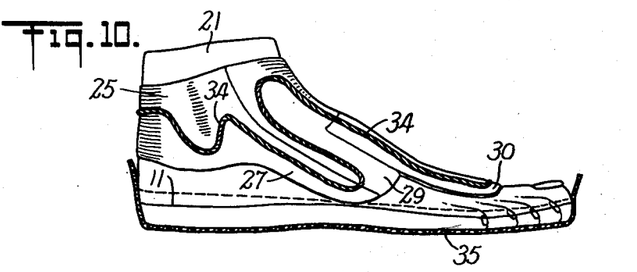
Fig. 10 is a side elevation of the outer side of the positive cast shown in Fig. 9, with the first layer of fabric folded upwardly on the outside of the cast.
Figure 11:
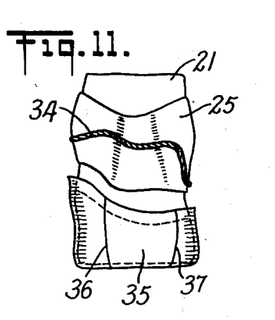
Fig. 11 is a rear elevation of the same.

Thereupon (Fig. 9) I apply the first piece of monk's cloth 35 by brushing the bottom of the cast 21 with latex #1 and the plaster of the cast 21 itself will cause the latex on the cloth 35 to set substantially immediately. This first piece of monk's cloth 35 has a symmetrical shape somewhat similar to that of a dumb-bell. Thereupon I apply latex #1 to the top front portion of the cast 21 and all around the margin thereof up to a position somewhat above the under-cut line 11. The monk's cloth 35 is thereupon provided with about two puckers 36 and 37 at the rear and four puckers 38, 39, 40 and 41 at the front, although more or less of the said puckers may be made, by pinching the monk's cloth 35 together with the fingers. These puckers are then cut off with the scissors so that the adjacent edges of the remaining cut-outs fit together. The remaining monk's cloth is then trimmed off all around, down to the extent to which the adhesive latex #1 has been applied.

Figure 12:
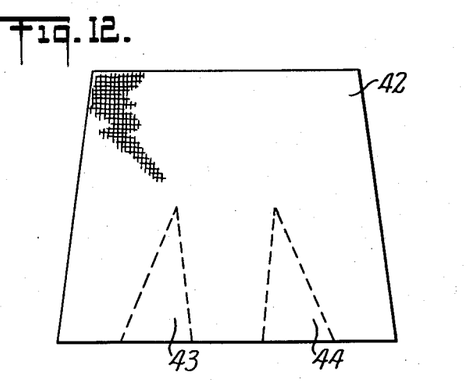
Fig. 12 shows a plan view of the second, or counter piece of monk's cloth for the heel.

Then, I provide a second piece of monk's cloth 42 which is a symmetrical counter or heel piece, and which has parallel upper and lower edges with its lateral edges inclined toward the upper portion, as shown in Fig. 12.

Figure 13:
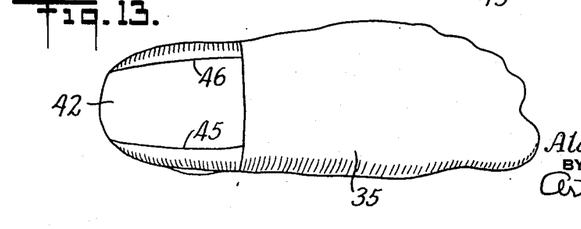
Fig. 13 is an underneath view of the cast after the second or counter piece has been placed in position thereon.

Also, I provide a neoprene latex #3 as a leather primer, and which may be comprised, for instance, of one part of latex #1 and two parts of distilled water, by volume, so as to provide a latex which readily penetrates leather. The rear portion of the edge liner 25 is now primed by applying the latex #3 thereon and thereupon this same portion of the edge liner 25 and the underneath portion of the first monk's cloth piece 35, beneath the rear of the heel, has applied thereto the latex #2. There is applied, also, thereto the upper portion of the counter piece 42 which has been previously dusted with powdered plaster of Paris. This counter piece is of such a size that, as shown in Fig. 13, it will extend downwardly beneath the heel of the cast 21, where the counter piece 42 is provided with two or more puckers 43 and 44. The puckers or tucks 43 and 44 are then cut off so that the adjacent edges 45 and 46 meet beneath the cast 21, as shown in Fig. 13. I then, with a spatula, press in the monk's cloth all around the cord 34.

The making of the shoe, up to this point, follows the procedure similar to that disclosed in my copending application upon Shoes and Method of Shoe Making as Well as Products Produced Therewith, Ser. No. 898, filed January 7, 1948, since abandoned.

Figure 14:
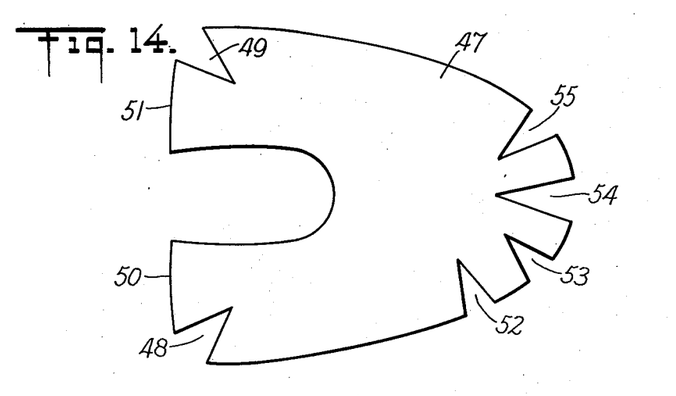
Fig. 14 is a plan view of a second piece of cloth which is to be attached over the top of the shoe.
Figure 15:
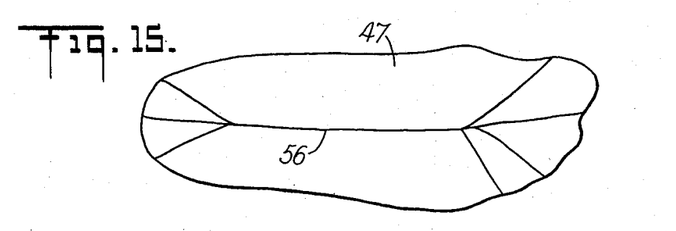
Fig. 15 is an underneath view of the shoe after the second piece of cloth has been attached thereto.
Figure 16:
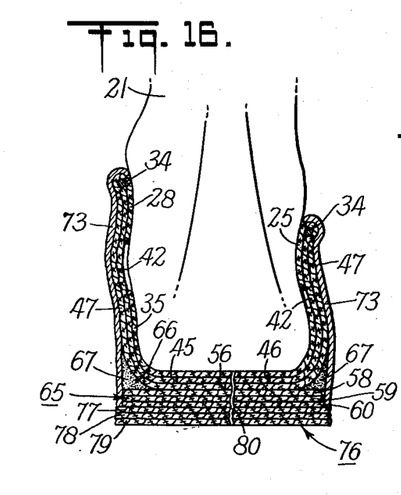
Fig. 16 is a diagrammatic vertical section showing the shoe just after the sole pieces of cloth have been secured in place thereon.
Figure 17:
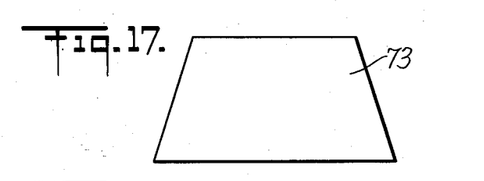
Fig. 17 is a plan view of the leather heel piece.

Then I provide a large cover piece of monk's cloth 47, approximately heart shaped, as shown in Fig. 14, and powder one surface of the same with plaster of Paris, which is to be the inner face of said monk's cloth 47. Next, I prime the upper extreme edges of the leather liners 25 and 28 with the priming solution #3 and thereupon cover the whole of the top of the shoe with the thick latex #2 and apply thereto the cover piece of monk's cloth 47, but so as to avoid leaving any wrinkles. In order to accomplish this, cut-outs may be resorted to. For instance cut-outs 48 and 49 may be cut off with scissors at the rear of the heart-shaped piece 47, adjacent to rear edges 50 and 51, which rear edges 50 and 51 become located at the extreme rear of the shoe adjacent to each other, and front cut-outs 52, 53, 54 and 55 may be made similarly at the front of the piece 47. All of the lower edges of the monk's cloth 47 are then folded over the underneath portion of the shoe, as shown in Fig. 15, so as to have meeting edges 56. The shoe is now allowed to dry for about four or five hours, for the latex to gel, and is then inverted.

Figure 19:
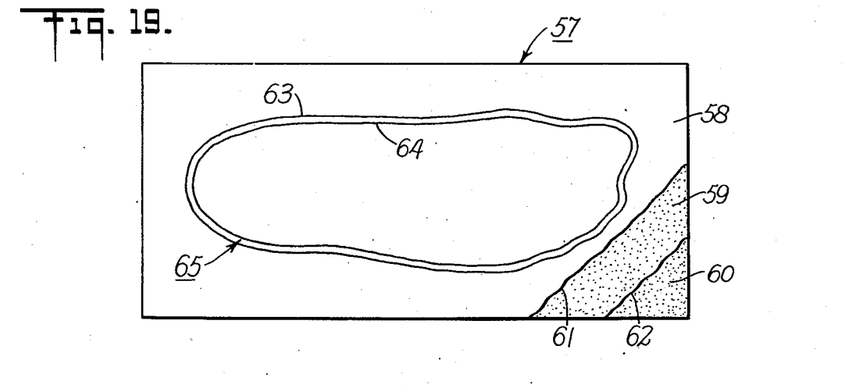
Fig. 19 is a plan view of a composite sheet of soft layers of monk's cloth or ratine secured together with an adhesive, used for making the sole of the shoe.
Figure 20:
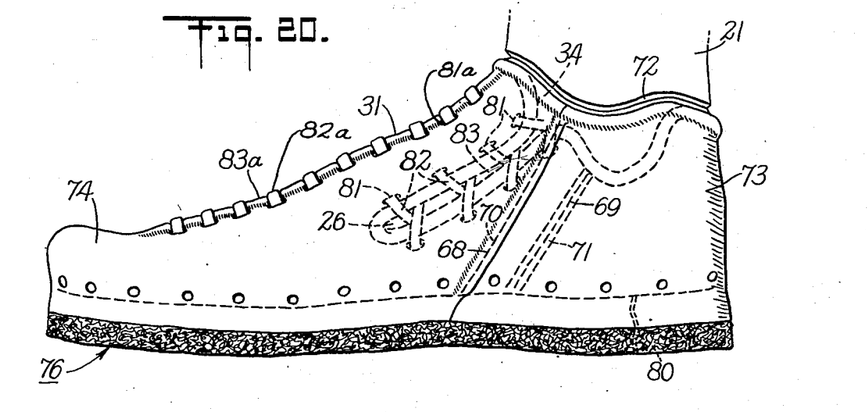
Fig. 20 is a side elevation showing the inner face of the right shoe after applying the leather front piece and the leather heel piece and showing, also, the lacings of the completed shoe made therewith.
Figure 21:
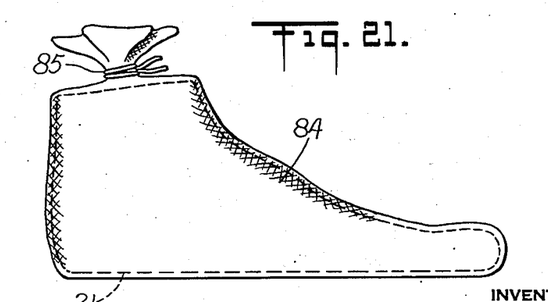
Fig. 21 is a vertical section of the cast having a sock tied thereon for carrying out a modified form of the process.

Thereupon, I produce a large composite sheet of stock material 57 made from two or more layers, but preferably three layers 58, 59 and 60, of monk's cloth comprised of loose woven fabric or ratine, which is a loose woven fabric having relatively large protruding loops of interwoven woof and weft threads in all three layers, for instance as disclosed in my copending application Ser. No. 555,005, on Laminated Pile Fabric, filed September 20, 1944, now Patent No. 2,448,455, granted August 31, 1948; or with two monk's cloth layers alternated with a ratine layer or with two ratine layers alternated with a monk's cloth layer. Any number of such layers, alternating or not, may be used if desired. These plural layers of material may be stuck together with coatings on the adjacent surfaces, for instance as at 61 and 62, with the thick latex #2. The composite sheet of material 57 thus formed is allowed to set, for example by standing for about ten days, so that it has some resultant stiffness. With a pencil I then make an outline 63 around the foot 64 placed thereon so that the outline 63 is about ¼" beyond the edge of the foot 64, as shown in Fig. 19. Thereupon I cut around the line 63 with a pair of scissors. I now stick a cut-out piece 65, thus formed, to the bottom of the layer of material 47, which is on the upturned cast as previously referred to, using the thick latex #2 on both the adjacent faces of the material 47 and the cut-out piece 65. Then, with shears, I trim around the margin of the piece 65 so as to be vertically in alignment with the outside edge of the fabric on the outside of the cast 21. This leaves a marginal recess 66 all around the shoe between the monk's cloth 47 and the composite material 65.

I now prepare a mud of latex or some other adhesive liquid. This may be made, for example, by utilizing either of the different forms of latex #1 and #2 mentioned herein, using a sufficient quantity thereof to form a product of a mud-like consistency with a powdered yieldable filling such as wood or cork flour, for instance, in the proportion of 2 parts by volume of cork flour, 4 parts by volume of balsa wood flour and 1 part by volume of pine wood flour. This composition is desirable as the cork flour alone causes the latex to gel too fast and the balsa wood flour alone causes the latex to gel too slowly, although cork flour or balsa wood flour can be used alone, if desired. The pine wood flour aids in the smooth spreading of the mud with a spatula. These proportions can be varied widely, in accordance with the chemical and gelling properties of the particular latex used, or for any other reason. Also, the pine wood flour can be omitted, if desired, or pine wood flour alone can be used with natural or any other latex. The wood flour is mixed preferably with the thick latex #2 in sufficient quantity up to a point where the material just begins to be shred-like but while still remaining plastic.

Thereupon I prime the marginal recess 66 with the thick latex #2 and introduce therein, or fill it with, the mud 67 all around the margin of the shoe. This arrangement, in fact, provides a filling above a cofferdam formed by the layers 58, 59 and 60 and obviates the necessity of filling in below a cofferdam in making the shoe. This arrangement provides approximately ¾ of the depth curvature of the plantar portion of the foot at the upper side portions of the shoe while leaving the residual approximately ¼ of the depth curvature of the plantar part of the foot to be occupied by the yielding impressible layers 58, 59 and 60 forming a cushioning sole, which from the wearing of the shoe is to produce the resultant depth conformations in the layers 58, 59 and 60. The margin of the layers 58, 59 and 60 is now cut off, with shears, all around the shoe, so as to be even with the edges of the latter.

Now, I may provide an outer covering for the shoe, which will be of leather assuming that the shoe is to be covered with leather. For this purpose I apply approximately-vertical pencil lines 68 and 69 to the opposite sides of the shoe at the places shown in Fig. 20, the line 68 on the inner face of the shoe being slightly in advance of the line 69 on the outer face of the shoe. Along these pencil lines there is then applied, with an eye dropper, the thin latex #1 or rubber cement, and woven or twisted cotton cords 70 and 71 on opposite sides of the shoe, previously dusted with plaster of Paris. Similarly, all around the upper edge of the shoe and around the slits 26 and 31, having thereon the cord 34, there is applied a further quantity of the latex #1 with an eye dropper. Then the shoe is trimmed all around the free edges of the same and between the portions of the cord adjacent to the slits 26 and 31, leaving marginal gaps of about ½" and ¼", respectively, for said slits. Next, with a sharp tool similar to an awl, I make a scratch or continuous V-shaped recess 72 in the surface of the cast 21 all around and adjacent to the cord 34 applied to the margin of the shoe as above. I then apply to the shoe a leather counter piece 73, the inner face of which has been previously provided with the leather priming latex #3 and immediately afterward with a coating of latex #2, and after the rear portion of the shoe having the surface of monk's cloth has been provided with a coating of latex #2. The two wet surfaces are brought together so that they firmly adhere and with the front edges of the leather counter piece 73 extending over the top of the cords 70 and 71. The leather used for covering the outside of the shoe is preferably a soft calf or a soft kid leather, but other types of leather could be used if desired. The outside of the leather is now rubbed well onto the shoe with the hand or fingers and with the aid of a cloth wet with saddle soap while also tooling in the edges all around the same and down into the scratch or V-shaped recess 72 in the cast 21. After the edge of the leather has been firmly tooled into the recess 72 the edge of the leather is trimmed off in the recess with a sharp knife. This avoids the necessity of sewing. Then, with an eye dropper, I feed into the recess 72 a little more of the

Figure 18:
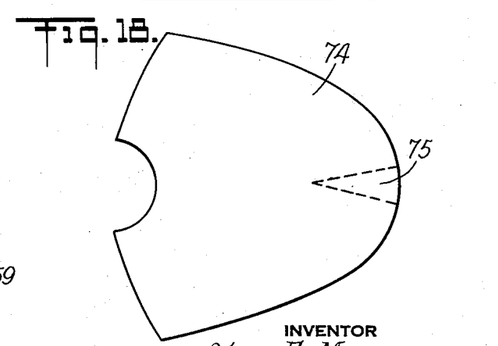
Fig. 18 is a plan view of the leather front piece.

1 latex solution and again tool in the edge of the leather around the cord 34. Along the two vertical lines 68 and 69 at the sides of the shoe, the leather counter piece 73 is now trimmed back to the center of the outside portions of the vertical cords 70 and 71. Thereupon, I apply to the front of the shoe a heart-shaped front piece of leather 74 in the same manner as the counter piece of leather 73 has been applied and extending into the V-shaped recess 72, while rubbing it in in the same manner, but so that the two vertical side edges of the front piece 74 end at the base of the rear sides of the cords 70 and 71. In fitting the rear edges of the front piece 74 over said cords 70 and 71 some additional latex #1 is spread over the same adjacent to the said cords so that the vertical edges of the front piece 74 will then overlap the heel counter piece 73. If desired, a notch 75 can be cut out at the front of the front piece 74 to make a more effective fit opposite to the big toe of the foot. See Fig. 18.

Now there can be applied an outer laminated sole 76, comprised of one or more layers of terry cloth or ratine 77, 78 and 79, which ultimately, by walking thereon, becomes shaped under the weight of the body and the foot of the wearer to conform to the contours of the plantar portion of the foot, as, preferably, this shoe sole 76 can be worn before the latex therein has entirely set. In fact, if desired, the shoe sole 57 could be applied and worn so as to retain the foot shape after the sole 57 has partly set. In other words, either or both of these soles 57 and 76 can be applied to the shoe and worn while the latex in said shoe soles has only gelled or has only partly set. This outer sole 76 may be made with one or more layers of the said terry cloth or ratine, alternated as above or all alike, all of which layers are secured together by each being impregnated with the thin latex #1 followed by brushing on thick latex #2, and to which layers the plaster of Paris powder is applied on each of the adjacent surfaces of the layers 77, 78 and 79 and in such a manner that the loops of the terry cloth and the ratine become interlocked or interfitted. The leather pieces 73 and 74, it will be noted, extend down to the upper portion of the outer sole 76. The margin of the outer sole 76 can now be trimmed around the shoe flush with the surface of the leather pieces 73 and 74, or can be allowed to extend beyond the same, if desired. The sole 76 can be stained with a leather stain to any desired shade or color. Any desired eyelets 81 and 81a and lacings 82 and 82a, shown on one side and the top respectively of the shoe in Fig. 20, can now be provided in the shoe after making slits 83, 83a in the leather piece 74. The cast can then be removed and the interior of the shoe brushed out with a motor-driven brush, and this can be accomplished, if desired, before introducing the lacings 82 and 82a.

The shoe can now be worn before the latex has completely set in either or both of the soles 57 and 76, that is to say at any time in one to ten days after the latex is applied to either or both of said soles, which will aid in conforming the soles 57 and 76 to the contours of the plantar portion of the foot; or the shoe may be worn after both the soles 57 and 76 have completely set. Instead of the sole 76, if desired, any other sole can be used, or even an ordinary leather sole, as even the latter is somewhat impressible by the foot.

In the modification of the shoe made in accordance with my invention as shown for instance in Figs. 21 to 24, I provide even a simpler procedure which enables this type of shoe to be still more available for general use. In this form of my invention, it is not even necessary or desirable to use leather for an outer covering. This type of shoe can be made almost as cheaply as any other practicable types of shoes.

Figures 22, 25:
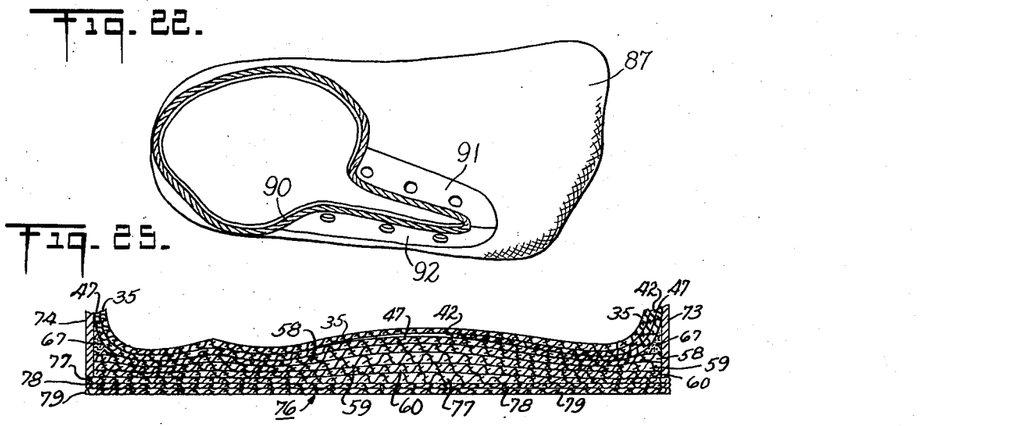
Fig. 22 is a plan view showing the modified form of shoe of Fig. 21, after having the strengthening pieces applied to the same for the lacing eyelets.
Fig. 25 is a longitudinal cross-section of the sole, showing the shaped form thereof, relating to Figs. 1 to 10.
Figure 23:
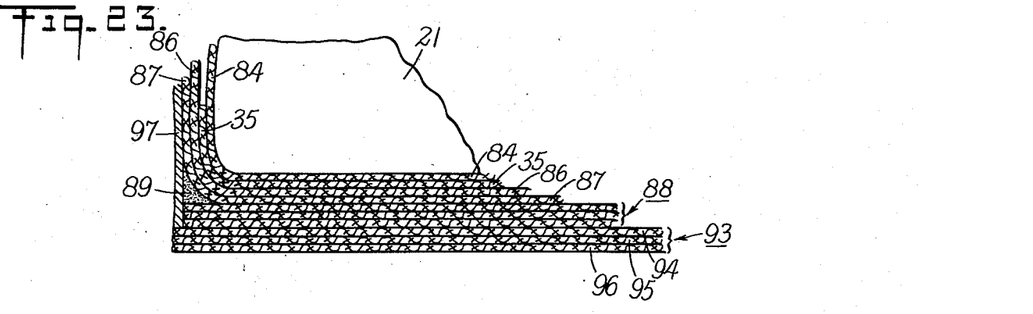
Fig. 23 is a vertical section of a portion of the form of shoe shown in Fig. 21, showing the outer fabric layers in relation to the sole thereof.
Figure 24:
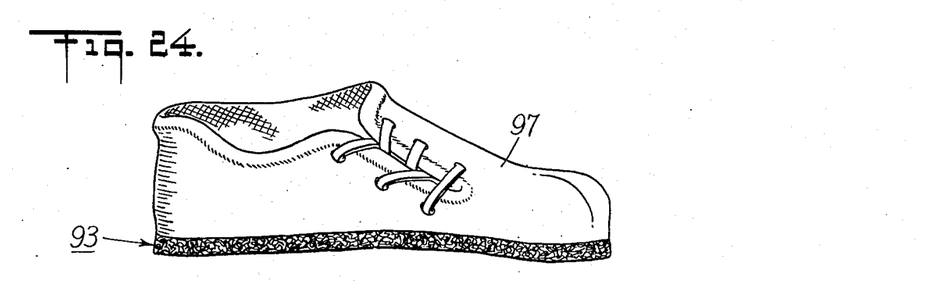
Fig. 24 is a side elevation, partly in section, showing the modified form of shoe of Fig. 21, and without the leather covering.

In this form of my invention, a sock 84 of woven cotton or any other textile fibres, etc., is obtained, which will stretch tightly over the cast 21, made as above described, the sock being drawn together at the top with a string 85. I then apply thereto the first piece 35, such as hereinabove described, after having powdered the sock with plaster of Paris and applied, by brushing to one side of the first piece, the thick latex #2 and in such a manner as to avoid the latex passing through or penetrating to the inner surface of the sock 84. I then make a heel piece 86 of monk's cloth, shaped like the heel piece 42, and apply it in the same way as hereinabove described. Thereupon, I apply to the outer surface of the shoe an overall piece 87, shaped like the piece 47, and cover over the whole bottom of the sock therewith in the same manner as shown in Fig. 15, but in such a way as to avoid having the latex penetrate through the sock 84. Now I apply a cushioning sole 88, the same as in the case of the sole 57, comprised of the three or more layers of monk's cloth or ratine stuck together as above described. Thereupon, I cut off or trim around the edge of the sole 88 with a scissors, as above described, and apply a mud 89 of the character above described, in the recess formed between the sole and the overall piece 87 around the margin of the shoe. I then make a line with a pencil to provide for the single slit in the shoe, which is located at the front and at one side of the high point or ridge of the foot, the line for the slit being made so as to provide by trimming thereafter a cut-out about ½" in width with a rounded lower end at the lower end of the slit. Similarly, a line is made to indicate the upper margin of the shoe. A cord 90, as for instance of woven or twisted fish line material, is then powdered with plaster of Paris and caused to adhere all around the said lines at the slit and top of the shoe with the aid of latex #1 or rubber cement, the ends of the cord preferably ending at the middle of the inner side of the shoe. Two pieces of tape 91 and 92 are now caused to adhere to the two sides, respectively, of the front slit as shown in Fig. 22, the tape being applied with the aid of thick latex #2 and plaster of Paris powder. An outer sole 93, comprised of layers 94, 95 and 96, or any other number of layers of the sole material as described in connection with the sole 76, is now applied to the bottom of the shoe in the same manner as previously described except that in this instance the margin of the sole 93 is made to extend, preferably, beyond the margin of the cushioning sole 88.

Thereupon I apply a final cover piece 97 comprised of monk's cloth or ratine, cut on the bias, and having the same shape approximately as the cover piece 47 but without any cut-out portions, the same being applied in a similar manner as previously described, but in this instance by powdering the inner side of the cloth with plaster of Paris and applying the thick latex #2 on the shoe. This cover piece 97, while wet, is then pressed gently with the hands onto the monk's cloth layer on the shoe, care being taken not to press too hard, so as to avoid having the latex go through the sock 84. Then, powdered plaster of Paris is applied very thoroughly to the outside of the monk's cloth or ratine 97 so as to thoroughly penetrate the loops and web of the cover piece. I then coat the cover piece 97 with the primer solution of latex #3 previously described, which, for instance, may be comprised of one part of thick latex by volume and two parts of distilled water by volume. If desired, before applying the primer to the cover piece 97 I may apply any desired coloring, such as a water soluble dye, to stain the priming material.

Thereupon, I cut off the edges at the slit and the shoe top with shears after the shoe has been allowed to dry for a short time, for instance about two hours, under a fan. Now, if desired, I paint some of the thick latex #2 onto the sole edge, which is approximately ¾" deep, and also onto the upper shoe edge and then coat the sole margin and the upper shoe edge with an enamel which will stick to the rubber. The shoe is now completed by punching in the eyelets and introducing the lacing and also an electrical conductor through the sole, as previously described, if desired.

It will be understood that any other additional covering material may be applied onto the shoe instead of the cover piece 97, such for instance as cotton duck, fabrics of all kinds, leather, sprayed lacquers, metal dusting powders, etc., with the aid of rubber cement. These shoes are readily washable and can be redyed, also, whenever desired.

While I have described my invention above in detail I wish it to be understood that many changes may be made therein without departing from the spirit of the same.

I claim:

1. A process which comprises making an article of footwear by producing a form-retaining upper conforming intimately to the varying upper contours of a foot of the actual wearer thereof, said upper being provided wtih a bottom portion which covers the bottom of the foot, then securing to said bottom portion a substantially flat impressionable sole of plastic materials of substantially uniform thickness conformable at normal temperatures, by wearing, to the underneath contours of the foot, the flat sole margin extending far enough beyond the margin of the bottom portion of said upper so as to make a marginal recess, introducing a latex mud into said recess, and then so conforming the sole against pressure by the said foot while supported from above by the conforming contours of the upper.

2. A process which comprises making an article of footwear by producing a form-retaining upper, made of a fabric, conforming intimately to the varying upper contours of a foot of the actual wearer thereof, said upper being provided with a bottom portion which covers the bottom of the foot, then securing to said bottom portion a substantially flat impressionable sole of plastic materials of substantially uniform thickness conformable at normal temperatures, by wearing, to the underneath contours of the foot, the flat sole margin extending far enough beyond the margin of the bottom portion of said upper so as to make a marginal recess, introducing a latex mud into said recess, then so conforming the sole against pressure by the said foot while supported from above by the conforming contours of the upper, and applying a layer of material to cover the marginal recess and retain the latex mud in place.

ALAN E. MURRAY.

References Cited in the file of this patent

UNITED STATES PATENTS

| Number | Name | Date |
| --- | --- | --- |
| 1,039,437 | Pierce | Sept. 24, 1912 |
| 1,284,788 | Sawyer | Nov. 12, 1918 |
| 1,289,662 | Clark | Dec. 31, 1918 |
| 1,803,554 | Knilans | May 15, 1931 |
| 1,930,355 | Letterman | Oct. 10, 1933 |
| 2,092,909 | Daniels | Sept. 14, 1937 |
| 2,120,370 | Murray | June 14, 1938 |
| 2,136,815 | Forster | Nov. 15, 1938 |
| 2,147,455 | Murray | Feb. 14, 1939 |
| 2,323,801 | Davies | July 6, 1943 |
| 2,332,000 | Murray | Oct. 19, 1943 |
| 2,396,926 | Murray | Mar. 19, 1946 |
| 2,404,083 | Murray | July 16, 1946 |
| 2,530,737 | Sherwin | Nov. 21, 1950 |

FOREIGN PATENTS

| Number | Country | Date |
| --- | --- | --- |
| 12,786 | Great Britain | Nov. 26, 1908 |
| 335,629 | Great Britain | Oct. 2, 1930 |